United States Patent
Ino et al.

(10) Patent No.: US 10,410,682 B2
(45) Date of Patent: Sep. 10, 2019

(54) DISK DRIVE HOUSING

(71) Applicant: Nidec Corporation, Kyoto (JP)

(72) Inventors: Yasutaka Ino, Kyoto (JP); Toshiya Tsujita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/212,748

(22) Filed: Dec. 7, 2018

(65) Prior Publication Data

US 2019/0228807 A1 Jul. 25, 2019

(30) Foreign Application Priority Data

Jan. 19, 2018 (JP) .................................. 2018-007242

(51) Int. Cl.
*G11B 33/02* (2006.01)
*G11B 33/14* (2006.01)

(52) U.S. Cl.
CPC .......... *G11B 33/022* (2013.01); *G11B 33/027* (2013.01); *G11B 33/14* (2013.01); *G11B 33/1446* (2013.01)

(58) Field of Classification Search
None
See application file for complete search history.

(56) References Cited

U.S. PATENT DOCUMENTS

| 7,773,338 | B2 | 8/2010 | Hayakawa et al. |
| 8,196,284 | B2 * | 6/2012 | Uefune ................ G11B 25/043 29/603.03 |
| 8,854,767 | B2 | 10/2014 | Kodama et al. |
| 9,330,728 | B1 * | 5/2016 | Nakamura ........... G11B 33/027 |
| 9,336,817 | B1 * | 5/2016 | Hirasawa ........... G11B 19/2009 |
| 2006/0291093 | A1 * | 12/2006 | Xu ............................. G11B 5/11 360/99.21 |
| 2009/0120538 | A1 * | 5/2009 | Hamasaki .............. B22D 17/00 148/437 |

* cited by examiner

*Primary Examiner* — William J Klimowicz

(74) *Attorney, Agent, or Firm* — Keating & Bennett, LLP

(57) ABSTRACT

A disk drive housing includes an accommodation unit in which a disk and a motor are accommodated, the disk rotating about a center axis extending vertically, the motor rotating the disk; and a non-piercing first screw hole including a die-cast metal in which an upper surface is opened, the non-piercing first screw hole extending from a first end surface toward a second end surface. The first screw hole includes a first region disposed at a leading end of an inner surface of the first screw hole, the first region including a first portion of the die-cast metal member covered with a chill layer; and a second region in which a screw is disposed on an inner circumferential surface of the first screw hole, the second region including a second portion of the die-cast metal member that is exposed.

10 Claims, 4 Drawing Sheets

DISK DRIVE HOUSING

CROSS REFERENCE TO RELATED APPLICATIONS

This application claims the benefit of priority to Japanese Patent Application No. 2018-007242 filed on Jan. 19, 2018. The entire contents of this application are hereby incorporated herein by reference.

BACKGROUND OF THE INVENTION

1. Field of the Invention

The present disclosure relates to a disk drive housing.

2. Description of the Related Art

JP 2013-218752 A discloses a conventional disk drive base. A magnetic recording disk, a rotating body that rotates the magnetic recording disk, and a recording and reproducing head that records and reproduces information on the magnetic recording disk are accommodated in a base in which an upper surface is opened. The base is formed by cast-forming of an aluminum alloy. An inside of the base is filled with a helium gas, and the upper surface of the base is often closed with a top cover.

A plurality of screw holes are made in the upper surface of the base in order to fasten the top cover. A plurality of screw holes used to attach a circuit board and a plurality of screw holes used to attach a disk drive to a personal computer or the like are frequently made in a lower surface of the base.

However, in the disk drive base disclosed in JP 2013-218752 A, a cooling rate of a thick portion is slow during cast-forming, and a shrinkage cavity is generated in some cases. For this reason, the shrinkage cavity communicates the inside of the base with the screw holes, which results in a problem in that the filled helium gas leaks to the outside of the base.

SUMMARY OF THE INVENTION

A disk drive housing of the present disclosure includes an accommodation unit in which a disk and a motor are accommodated, the disk rotating about a center axis extending vertically, the motor rotating the disk; and a non-piercing first screw hole including a die-cast metal member in which an upper surface is opened, the non-piercing first screw hole extending from a first end surface toward a second end surface in an axial direction. The first screw hole includes a first region disposed at a leading end of an inner surface of the first screw hole, the first region including a first portion of the die-cast metal member covered with a chill layer; and a second region in which a screw is disposed on an inner circumferential surface of the first screw hole, the second region including a second portion of the die-cast metal member that is exposed.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, exemplary embodiments of the present disclosure will be described in detail with reference to the drawings. In this specification, an upper side in a center axis direction of a motor is referred to as an "upper side", and a lower side in the center axis direction of the motor is referred to as a "lower side". A vertical direction does not indicate a positional relationship or a direction when a disk drive housing is incorporated in an actual device. A direction parallel or substantially parallel to a center axis is referred to as an "axial direction", a radial direction centered around the center axis is referred to as a "radial direction", and a circumferential direction centered around the center axis is referred to as a "circumferential direction". In the specification, a shape or a positional relationship of each unit will be described with the axial direction as a vertical direction and with a side of a motor 2 with respect to a disk 50 as a bottom. The vertical direction is simply used in the description, but does not limit the actual positional relationship and the direction.

Figure 1:
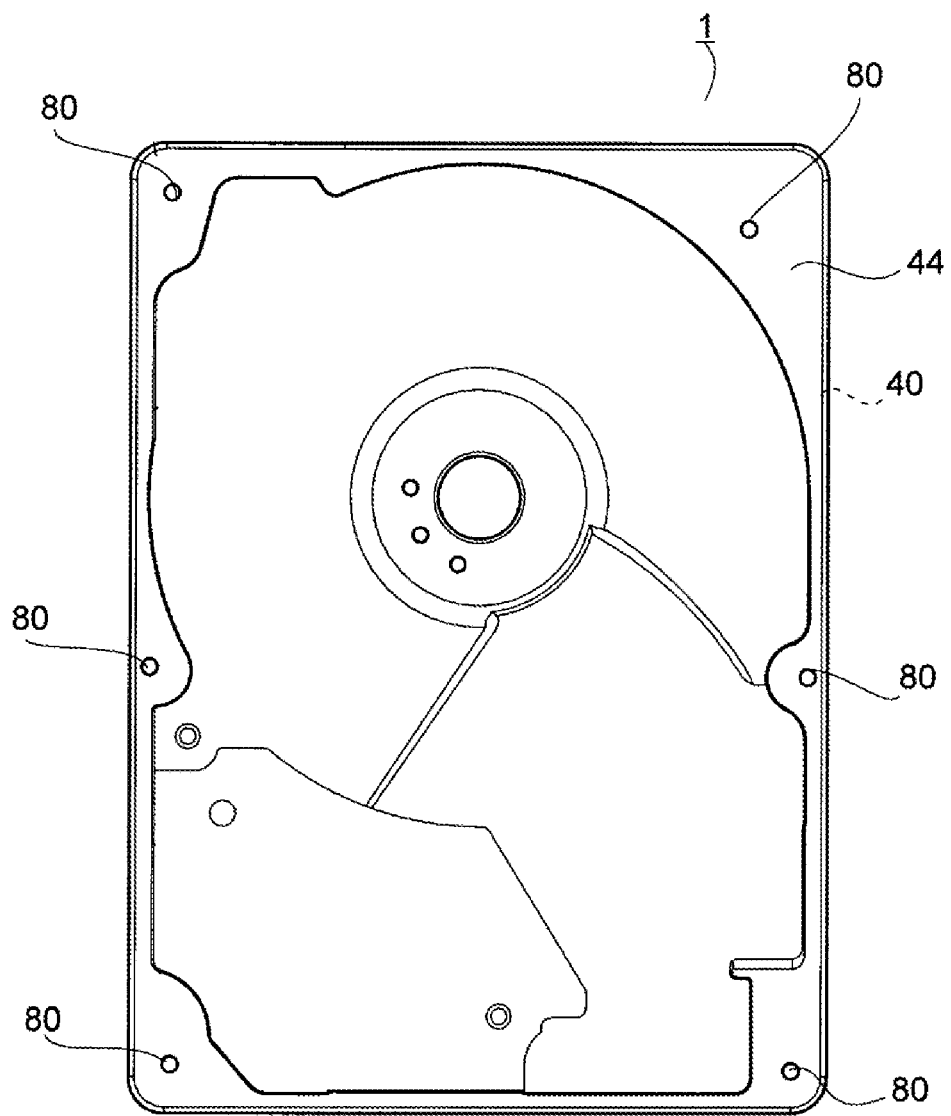
FIG. 1 is a plan view illustrating a disk drive housing according to an exemplary embodiment of the present disclosure.
Figure 2:
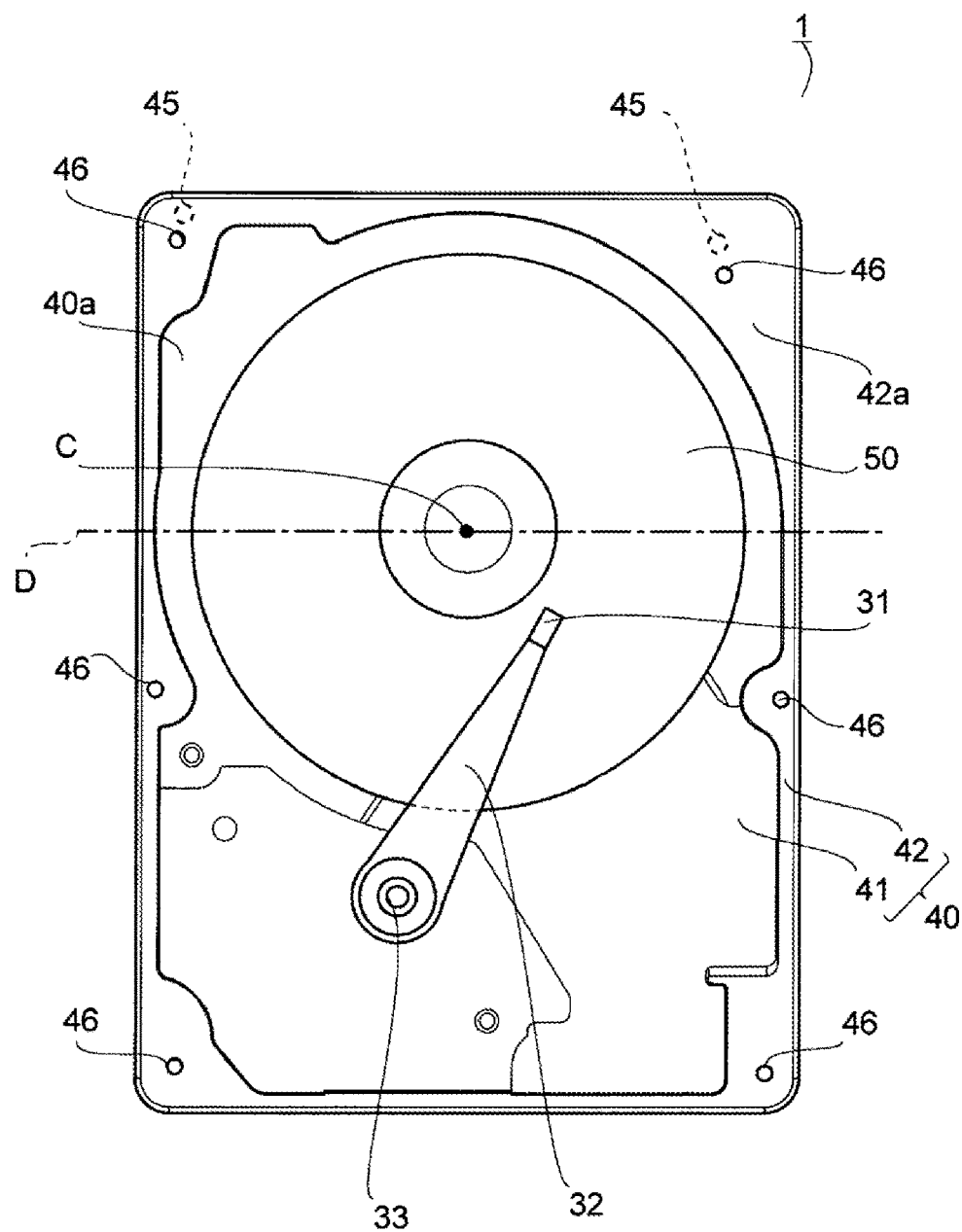
FIG. 2 is a plan view illustrating a disk drive housing according to an exemplary embodiment of the present disclosure.
Figure 3:
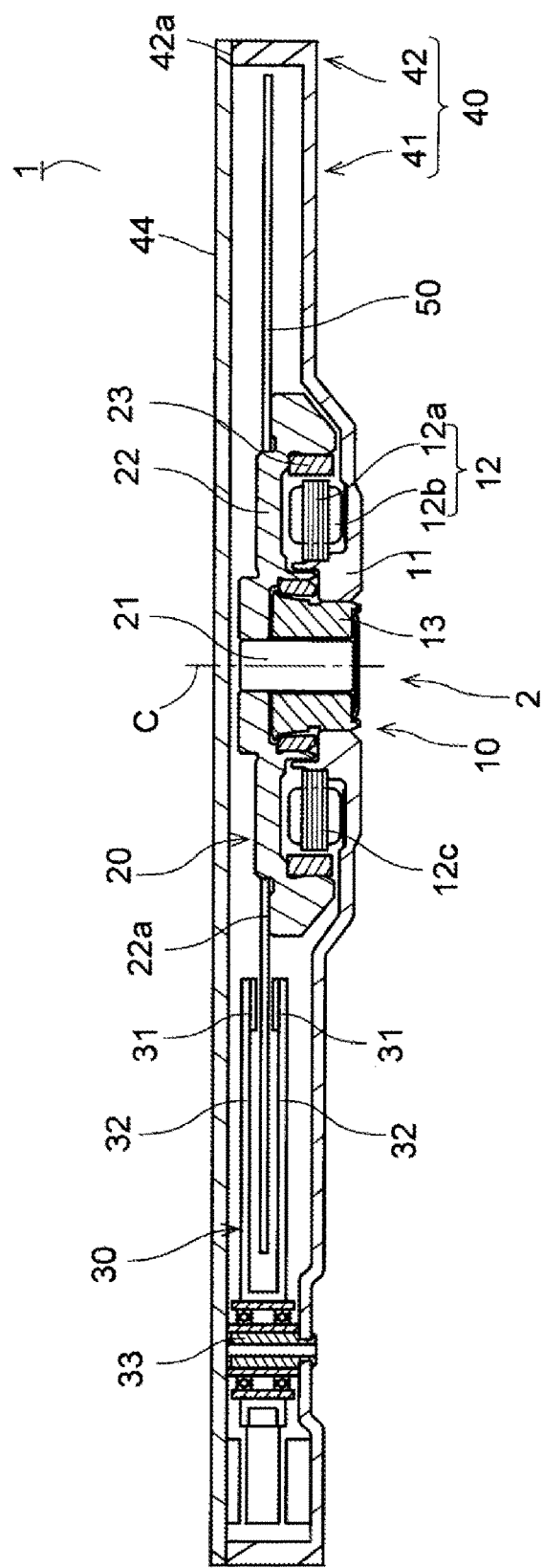
FIG. 3 is a vertical sectional view illustrating a disk drive housing of an exemplary embodiment of the present disclosure.

A disk drive housing according to an exemplary embodiment of the present disclosure will be described below. FIGS. 1 and 2 are plan views illustrating a disk drive housing 40 of the embodiment of the present disclosure. FIG. 2 illustrates a state in which a cover 44 is removed. FIG. 3 is a vertical sectional view illustrating the disk drive housing 40 of the embodiment of the present disclosure.

A disk drive 1 is a hard disk drive. The disk drive 1 includes the motor 2, a plurality of disks 50, an access unit 30, and a disk drive housing (hereinafter, abbreviated to a "housing") 40.

The motor 2 rotates the disk 50 about a center axis C while supporting the disk 50. The motor 2 includes a stationary unit 10 and a rotating unit 20. The stationary unit 10 stands still relative to the housing 40. The rotating unit 20 is supported so as to be rotatable relative to the stationary unit 10.

The stationary unit 10 includes a base 11, a stator 12, and a bearing unit 13. The base 11 expands substantially perpendicularly with respect to the center axis C on the lower side of the rotating unit 20. The base 11 is a part of the motor 2 and is also a part of the housing 40. The stator 12 and the bearing unit 13 are fixed to the base 11.

The stator 12 includes a stator core 12a that is a magnetic body, and a plurality of coils 12b. The stator core 12a includes a plurality of teeth 12c protruding radially outward. The plurality of coils 12b is constructed with a conductive wire wound around the teeth 12c.

The bearing unit 13 rotatably supports a shaft 21 on the side of the rotating unit 20. For example, a hydrodynamic bearing mechanism is used as the bearing unit 13.

The rotating unit 20 includes the shaft 21, a hub 22, and a magnet 23. The shaft 21 is a columnar member extending in the axial direction. A lower end of the shaft 21 is accommodated in the bearing unit 13.

The hub 22 is fixed to an upper end of the shaft 21, and expands radially outward. An upper surface of an outer circumferential unit 22a of the hub 22 supports the disk 50. The magnet 23 is fixed to an inner circumferential surface of the hub 22, and arranged so as to be opposed to a radial outside of the stator 12 at a predetermined distance. The magnet 23 has an annular shape, and an N pole and an S pole are alternately magnetized in the circumferential direction on the inner circumferential surface of the magnet 23.

When a drive current is supplied to the coil 12b, a magnetic flux is generated in the plurality of teeth 12c. Interaction of the magnetic flux between the teeth 12c and the magnet 23 generates torque in the circumferential direction. As a result, the rotating unit 20 rotates about the center axis C with respect to the stationary unit 10. The disk 50 supported by the hub 22 rotates about the center axis C together with the rotating unit 20.

The access unit 30 includes a head 31, an arm 32, and a head moving mechanism 33. The head 31 comes close to the disk 50 to magnetically perform reading and writing of information. The arm 32 supports the head 31. The head moving mechanism 33 moves the arm 32 to move the head 31 relative to the disk 50. The head 31 comes close to the rotating disk 50 to access the rotating disk 50.

The disk 50 is a disc-shaped information recording medium including a hole in a central portion. The disks 50 are mounted on the motor 2, and axially disposed in parallel with each other at equal intervals with a spacer (not illustrated) interposed therebetween.

The housing 40 is formed into a box shape in which a top is open, and includes an accommodation unit 40a. The disk 50, the motor 2, and the access unit 30 are accommodated in the accommodation unit 40a. The top opening of the housing 40 is closed by the cover 44.

In the embodiment, the housing 40 includes a flat plate 41 including the base 11, and a wall 42, and the accommodation unit 40a is formed in a space surrounded by the flat plate 41 and the wall 42. The flat plate 41 expands substantially perpendicularly with respect to the center axis C. The motor 2 and the access unit 30 are supported by the flat plate 41.

The wall 42 protrudes axially upward from an outer end edge of the flat plate 41, and surrounds the flat plate 41. A support surface 42a is formed on the upper surface of the wall 42, and a second screw hole 46 is made in the support surface 42a. The cover 44 is supported on the support surface 42a, and screws 80 (see FIG. 1) are fastened in the second screw holes 46 to fix the cover 44 and the housing 40.

A chassis constructed with the housing 40 and the cover 44 is filled with a gas having a density lower than that of air. Specifically, the chassis is filled with a helium gas. Instead of the helium gas, the chassis may be filled with a hydrogen gas, air, or the like.

A first screw hole 45 is made in a bottom surface 42b of the wall 42. A screw is fastened in the first screw hole 45 in order to attach a circuit board (not illustrated) connected to the motor 2 and the access unit 30. That is, the first screw hole 45 is disposed in a circumferential wall of the accommodation unit 40a.

The housing 40 is formed into a rectangular shape in planar view, and the first screw hole 45 is disposed in a region on the side opposite to the head 31 with respect to a parting line D perpendicular to a long side through the center axis C when viewed in the axial direction. Consequently, the first screw hole 45 can be disposed in a thick portion of the housing 40.

A screw may be fastened in the first screw hole 45 in order to attach the disk drive 1 to another device such as a personal computer.

Figure 4:
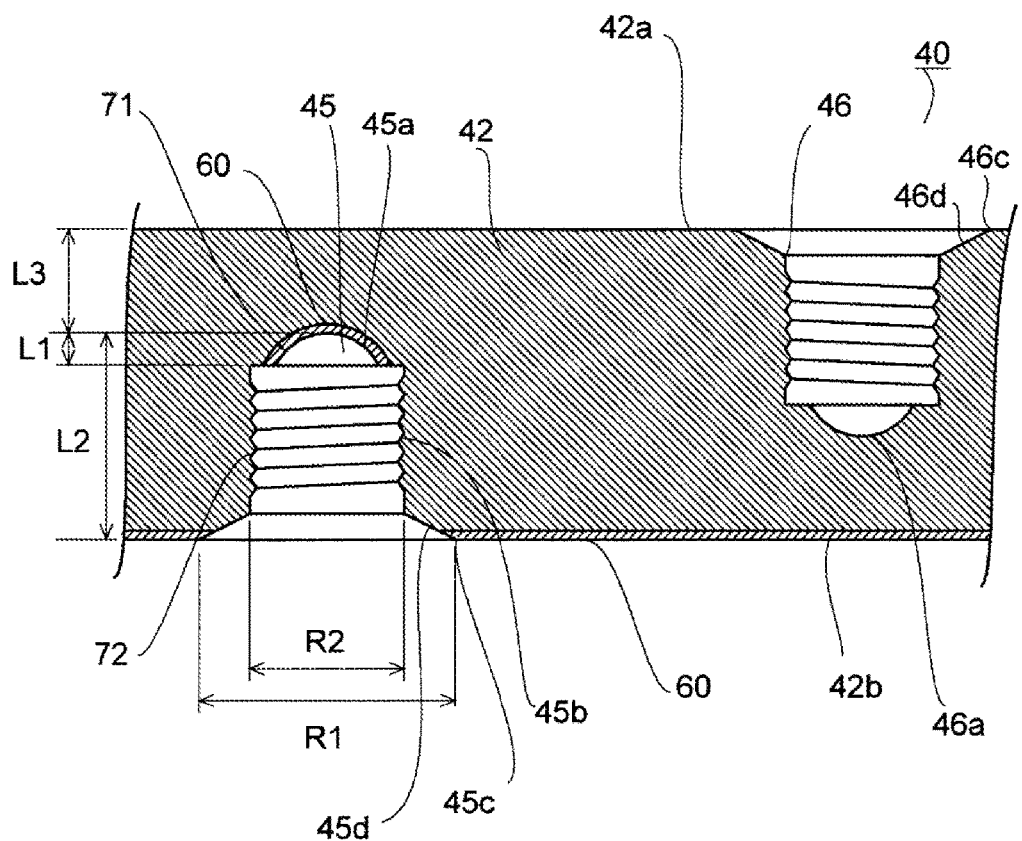
FIG. 4 is an enlarged vertical sectional view illustrating a portion of a disk drive housing according to an exemplary embodiment of the present disclosure.

FIG. 4 is an enlarged sectional view illustrating a part of the housing 40, and illustrates a vicinity of the wall 42. The housing 40 is formed by cast-forming of a die-casting member made of metal such as an aluminum alloy. Metal other than the aluminum alloy may be used as the die-casting member.

A chill layer 60 is formed on a lower surface of the flat plate 41 and the bottom surface 42b of the wall 42 of the housing 40. In the chill layer 60, a portion in contact with a metal mold is quenched when the housing 40 is molded by the casting, and an internal texture is denser than the metal portion of the die-casting member to increase strength. The chill layer 60 is not provided by cutting on the upper surface of the flat plate 41 and the support surface 42a of the wall 42 of the housing 40, but the metal portion of the die-casting member is exposed.

The first screw hole 45 extends from the bottom surface 42b of the wall 42 toward the support surface 42a, and the second screw hole 46 extends from the support surface 42a of the wall 42 toward the bottom surface 42b. That is, the first screw hole 45 extends from one end surface toward the other end surface in the axial direction of the housing 40, and the second screw hole 46 extends from the other end surface toward one end surface in the axial direction of the housing 40. The first screw hole 45 and the second screw hole 46 do not pierce the housing 40 in the axial direction, but are formed in a non-piercing manner.

A leading end 45a of the first screw hole 45 is formed to be convex toward the support surface 42a. A leading end 46a of the second screw hole 46 is formed to be convex toward the bottom surface 42b of the wall 42. The first screw hole 45 and the second screw hole 46 include flanges 45d, 46d on the side of openings 45c, 46c, and vertical sections of the flanges 45d, 46d are inclined in a direction in which a diameter expands toward the openings 45c, 46c. Screw heads of the screws fastened in the first screw hole 45 and the second screw hole 46 abut on the flanges 45d, 46d.

An inner surface of the first screw hole 45 includes a first region 71 and a second region 72. The first region 71 is disposed at the leading end 45a of the inner surface of the first screw hole 45, and the metal portion of the die-casting member is covered with the chill layer 60.

Because an internal texture of the chill layer 60 is dense as compared with the metal portion of the die-casting member, a shrinkage cavity is hardly generated in the chill layer 60. Consequently, even if the shrinkage cavity is generated between the first screw holes 45 and the support surface 42a during the cast-forming, the chill layer 60 can block the shrinkage cavity. Thus, the shrinkage cavity is prevented from being opened to the leading end 45a of the first screw hole 45. Consequently, the accommodation unit 40a and the first screw hole 45 can be prevented from communicating with each other through the shrinkage cavity. Thus, the helium gas can be prevented from leaking to the outside of the disk drive 1.

The second region 72 is disposed on the inner circumferential surface of the first screw hole 45, and a screw unit 45b into which the screw is screwed is formed in the second region 72. The second region 72 is not covered with the chill layer 60, but the metal portion of the die-casting member is exposed. Degradation of processing accuracy of the screw unit 45b can be reduced by forming the screw unit 45b in the metal portion of the die-casting member. A decrease in fastening strength of the screw of the screw unit 45b can be reduced.

The screw unit 45b is formed by cutting, and may be formed into either a female thread shape or a male thread shape depending on the shape of the threaded screw.

An axial length L1 of the first region 71 ranges from 20% to 35% with respect to an axial length L2 of the first screw hole 45. When the length L1 is less than 20% of the length L2, the region covered by the chill layer 60 is narrowed in the inner surface of the first screw hole 45, and the shrinkage cavity is easily opened in the inner surface of the first screw hole 45. For this reason, the communication between the shrinkage cavity and the first screw holes 45 can insufficiently be reduced. When the length L1 is larger than 35% of the length L2, the axial length of the screw unit 45b of the second region 72 is shortened, and the fastening strength of the screw is decreased.

An axial minimum distance L3 between the support surface (the other end surface) 42a of the housing 40 and the first region 71 is greater than or equal to 0.5 mm. Consequently, the distance between the support surface 42a and the first screw hole 45 is set greater than or equal to 0.5 mm, so that the decrease in strength of the housing 40 can be reduced.

The axial length L2 of the first screw hole 45 ranges from 55% to 75% with respect to an axial distance (L2+L3) between the bottom surface (one end surface) 42b where the first screw hole 45 is disposed and the support surface (the other end surface) 42a. When the length L2 is set greater than or equal to 55% of the distance (L2+L3), the distance between the first screw hole 45 and the support surface 42a can be shortened to reduce the generation of the shrinkage cavity between the first screw hole 45 and the support surface 42a. When the length L2 is set less than 75% of the distance (L2+L3), the decrease in strength of the housing 40 can be reduced.

A diameter R1 of the opening 45c formed in the bottom surface (one end surface) 42b of the housing 40 of the first screw hole 45 ranges from 40% to 70% with respect to the axial distance (L2+L3) between the bottom surface (one end surface) 42b of the housing 40 in which the first screw hole 45 is made and the support surface (the other end surface) 42a. When the diameter R1 is set greater than or equal to 40% of the distance (L2+L3), the decrease in fastening strength of the screw can be reduced. When the diameter R1 is set less than or equal to 70% of the distance (L2+L3), an inner circumferential area of the first screw hole 45 can be reduced, and the opening of the shrinkage cavity to the first screw hole 45 can be reduced.

A diameter R2 of the second region 72 of the first screw hole 45 ranges from 20% to 50% with respect to the axial distance (L2+L3) between the bottom surface (one end surface) 42b of the housing 40 in which the first screw hole 45 is made and the support surface (the other end surface) 42a. When the diameter R2 is set greater than or equal to 20% with respect to the distance (L2+L3), the decrease in fastening strength of the screw can be reduced. When the diameter R2 is set less than or equal to 50% of the distance (L2+L3), the inner circumferential area of the second region 72 of the first screw hole 45 can be reduced, and the opening of the shrinkage cavity to the second region 72 of the first screw hole 45 can be reduced.

The whole inner surface of the second screw hole 46 is not covered with the chill layer 60, but the metal portion of the die-casting member is exposed. On the other hand, in the bottom surface 42b of the wall 42, the metal portion of the die cast member is covered with the chill layer 60. That is, the bottom surface (one end surface) 42b opposed to the leading end 46a of the second screw hole 46 is covered with the chill layer 60.

For this reason, even if the shrinkage cavity is generated between the second screw hole 46 and the bottom surface 42b during the cast-forming, the chill layer 60 prevents the shrinkage cavity from being opened to the bottom surface 42b. Thus, the accommodation unit 40a can be prevented from communicating with the outside of the housing 40 through the shrinkage cavity and the second screw hole 46. Consequently, the helium gas can be prevented from leaking to the outside of the disk drive 1.

The first screw hole 45 and the second screw hole 46 are disposed at a position where the radial distance is less than or equal to 10 mm. When the first screw hole 45 and the second screw hole 46 are disposed close to each other, downsizing and weight-reducing the housing 40 can be achieved by radially thinning the wall 42. The relatively large disk 50 can be accommodated in the housing 40 by radially downsizing the housing 40. That is, the disk drive 1 in which a base unit suitable for a market need of higher-capacity disk is used can be provided.

The chill layer 60 is formed in the first region 71 of the first screw hole 45, and the shrinkage cavity appears between the leading end 45a of the first screw hole 45 and the second screw hole 46 during the cast-forming. Even in such cases, the opening of the shrinkage cavity to the first screw hole 45 can be reduced. Consequently, the first screw hole 45 and the second screw hole 46 can be prevented from communicating with each other through the shrinkage cavity.

The effect of the present disclosure will specifically be described below using Examples and Comparative example. Table 1 illustrates an evaluation result of the leakage of the helium gas in the housing 40.

The housings 40 according to the following Examples 1 to 3 and Comparative example were molded by the casting using an aluminum alloy as a material. In the housing 40 of Example 1, the axial length L1 of the first region 71 is 33.3% of the axial length L2 of the first screw hole 45. In the housing 40 of Example 2, the axial length L1 of the first region 71 is 28.9% of the axial length L2 of the first screw hole 45. In the housing 40 of Example 3, the axial length L1 of the first region 71 is 22.2% of the axial length L2 of the first screw hole 45.

In the housing 40 of Comparative example, the axial length L1 of the first region 71 is 15.6% of the axial length L2 of the first screw hole 45.

100 housings 40 of each of Examples 1 to 3 and Comparative example were prepared, and a rate of incidence in which the leakage of the helium gas was generated when the inside of the chassis constructed with the housing 40 and the cover 44 was filled with the helium gas was measured. The measurement results are illustrated in Table 1.

As illustrated in Table 1, in the housings 40 of Examples 1 to 3 in which the axial length L1 of the first region 71 was greater than or equal to 20% of the axial length L2 of the first screw hole 45, it was confirmed that the rate of incidence of helium gas leakage was less than or equal to 0.12%, and that the helium gas leakage was able to be reduced. On the other hand, in the housing 40 of Comparative example in which the axial length L1 of the first region 71 was less than 20% of the axial length L2 of the first screw hole 45, it was confirmed that the rate of incidence of helium gas leakage was greater than or equal to 2%, and that the communication between the shrinkage cavity and the first screw hole 45 was not able to be sufficiently reduced.

The above embodiment is merely an example of the present disclosure. The configuration of the embodiment may appropriately be changed without departing from the technical idea of the present disclosure. The embodiment may be implemented in combination within a feasible range. For example, in the embodiment, the first region 71 covered with the chill layer 60 is provided at the leading end 45a of the first screw hole 45. Alternatively, the first region 71 covered with the chill layer 60 may be provided at the leading end of the second screw hole 46.

The first region 71 and the second region 72 may be provided in screw holes except for the first screw hole 45 and the second screw hole 46. For example, the first region 71 and the second region 72 are provided in a screw hole used to attach the motor 2 or the head moving mechanism 33 to the housing 40 or a screw hole used to attach the disk drive 1 to another device such as a personal computer.

For example, the present disclosure can be used for a housing used in a disk drive such as a hard disk drive.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A disk drive housing comprising:
   an accommodation unit in which a disk and a motor are accommodated, the disk rotating about a center axis extending vertically, the motor rotating the disk; and
   a non-piercing first screw hole including a die-cast metal member in which an upper surface is opened, the non-piercing first screw hole extending from a first end surface toward a second end surface in axial direction; wherein
   the first screw hole includes:
      a first region disposed at a leading end of an inner surface of the first screw hole, the first region including a first portion of the die-cast metal member covered with a chill layer; and
      a second region in which a screw is disposed on an inner circumferential surface of the first screw hole, the second region including a second portion of the die-cast metal member that is exposed.

2. The disk drive housing according to claim 1, wherein an axial length of the first region ranges from 20% to 35% inclusive with respect to an axial length of the first screw hole.

3. The disk drive housing according to claim 1, wherein an axial minimum distance between the second end surface and the first region is greater than or equal to 0.5 mm.

4. The disk drive housing according to claim 1, wherein the first screw hole is disposed in a circumferential wall of the accommodation unit.

5. The disk drive housing according to claim 1, wherein
   the disk drive housing has a rectangular shape in planar view; and
   the first screw hole is disposed in a region on a side opposite to a head that records and reproduces information on the disk with respect to a parting line orthogonal to a long side through the center axis when viewed in the axial direction.

6. The disk drive housing according to claim 1, wherein an axial length of the first screw hole ranges from 55% to 75% inclusive with respect to an axial distance between the first end surface and the second end surface in which the first screw hole is provided.

7. The disk drive housing according to claim 1, wherein a diameter of an opening in the first end surface of the first screw hole ranges from 40% to 70% inclusive with respect to an axial distance between the first end surface and the second end surface in which the first screw hole is provided.

8. The disk drive housing according to claim 1, wherein a diameter of the second region of the first screw hole ranges from 20% to 50% inclusive with respect to an axial distance between the first end surface and the second end surface in which the first screw hole is provided.

9. The disk drive housing according to claim 1, further comprising a non-piercing second screw hole that is adjacent to the first screw hole and extends from the second end surface toward the first end surface in the axial direction; wherein
   in an entire inner surface of the second screw hole, the second portion of the die-cast metal member is exposed; and
   a radial distance between the first screw hole and the second screw hole is less than or equal to 10 mm.

10. The disk drive housing according to claim 9, wherein the second portion of the die-cast metal member is covered with the chill layer on the first end surface opposed to a leading end of the second screw hole.

* * * * *